No. 793,902. Patented July 4, 1905.

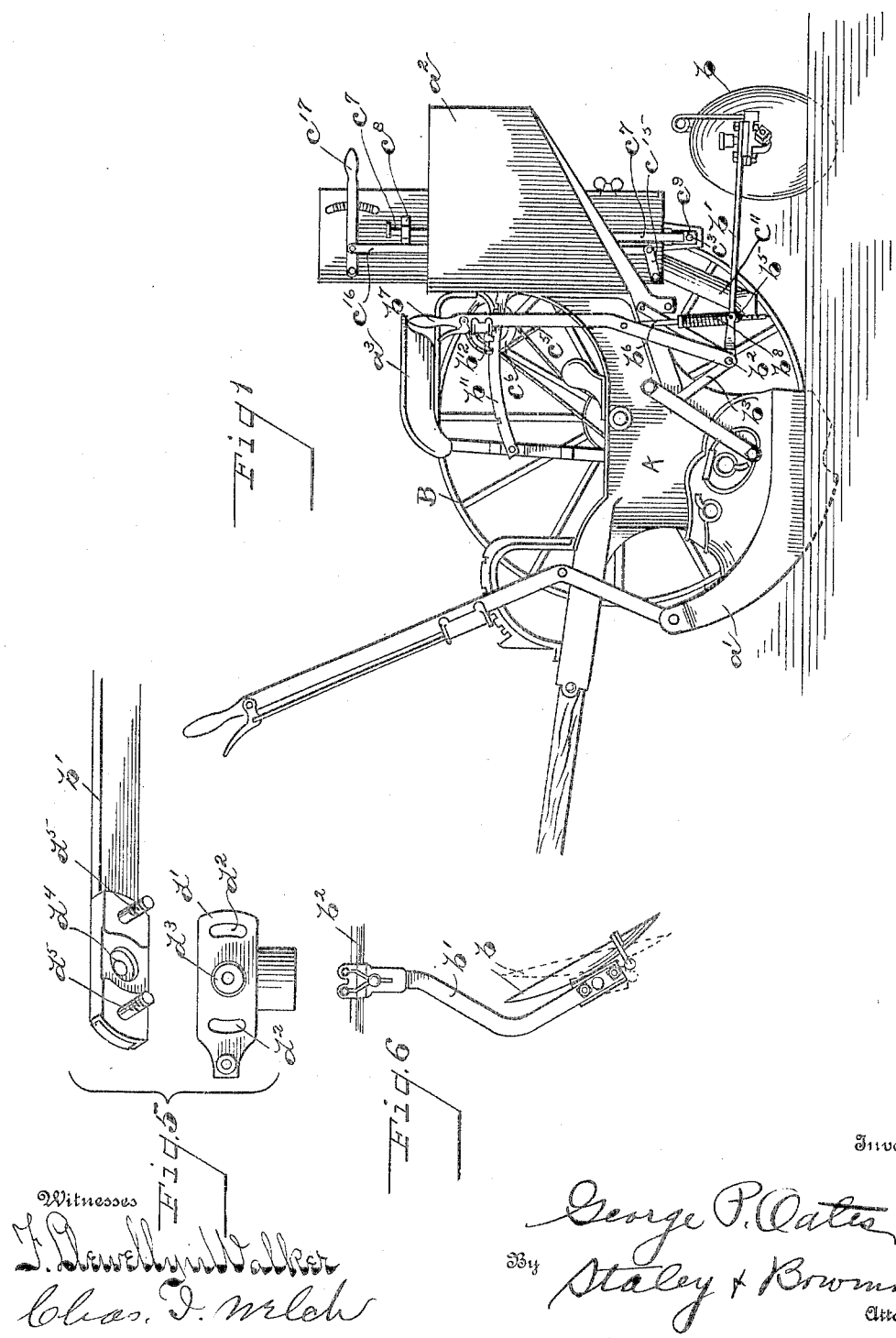

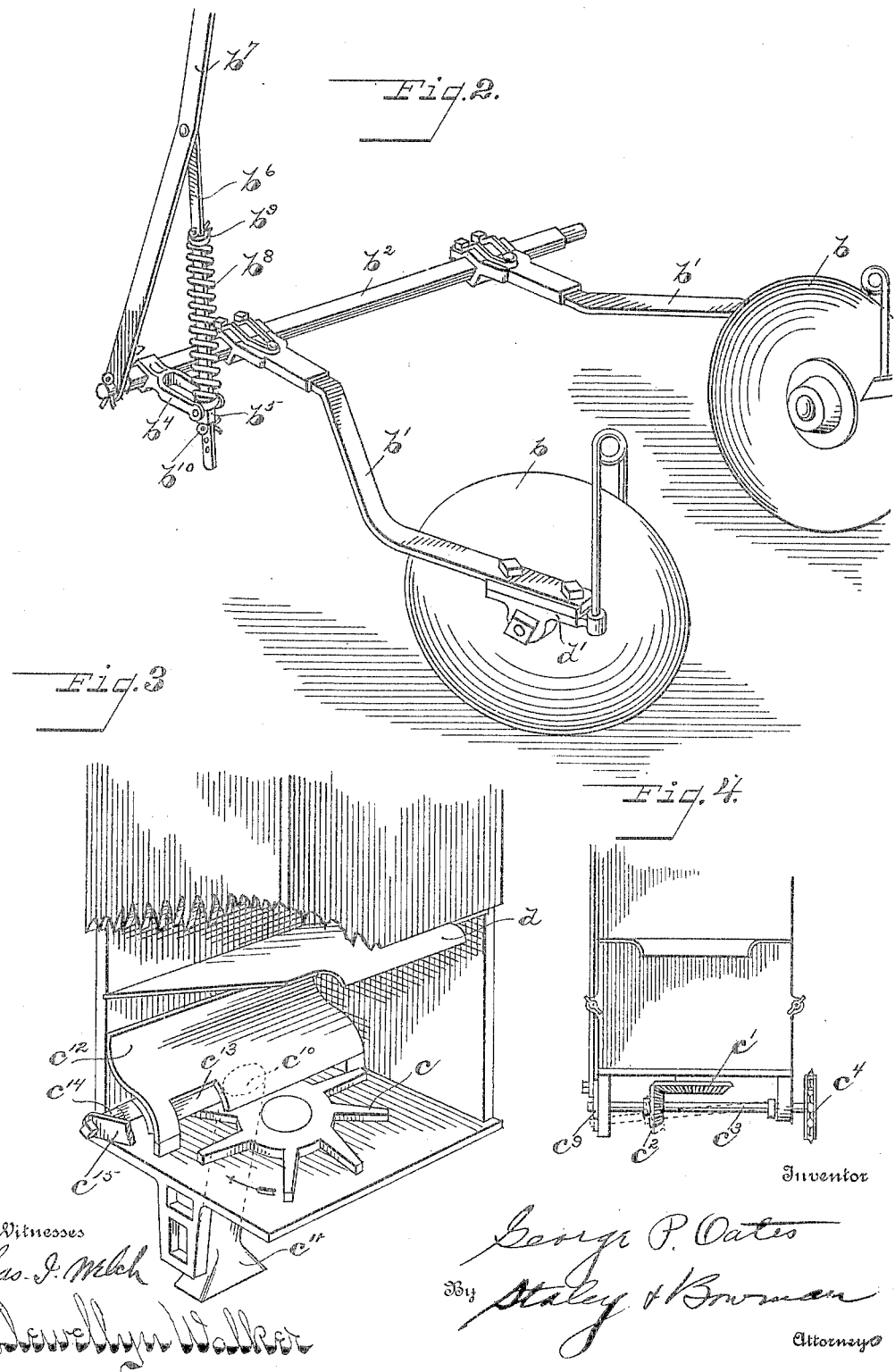

UNITED STATES PATENT OFFICE.

GEORGE P. OATES, OF SPRINGFIELD, OHIO, ASSIGNOR TO AMERICAN SEEDING MACHINE COMPANY, OF JERSEY CITY, NEW JERSEY, A CORPORATION OF NEW JERSEY.

POTATO-PLANTER.

SPECIFICATION forming part of Letters Patent No. 793,902, dated July 4, 1905.

Application filed March 20, 1905. Serial No. 250,896.

*To all whom it may concern:*

Be it known that I, GEORGE P. OATES, a citizen of the United States, residing at Springfield, in the county of Clark and State of Ohio, have invented certain new and useful Improvements in Potato-Planters, of which the following is a specification.

My invention relates particularly to improvements in a machine for planting potatoes. My object is to construct an improved machine for properly feeding, planting, and covering potatoes or similar plants and simultaneously feeding fertilizing substances accurately and positively and delivering same in a manner best adapted to be covered in the ground with the potatoes.

Figure 1 is a side elevation of the machine. Fig. 2 is a perspective view of the covering devices. Figs. 3 and 4 are detail views of the distributer for the fertilizing material, and Figs. 5 and 6 are detail views of the furrow-coverer and its connection with the draft-bar.

Like letters of reference indicate like parts throughout the different views.

In my machine, A indicates the frame of the machine, which is supported by carrying-wheels B in the usual manner.

$a'$ indicates the furrow-opener, which is supported by the frame of the machine and adjustably connected therewith, as shown in Fig. 1.

The hopper for the potato is indicated by $a^2$, and potatoes are fed from the hopper into a furrow-opener $a'$ of the shoe or runner type, as indicated in Fig. 1. The operator's seat is indicated by $a^3$, which is supported by the frame of the machine in the usual manner.

The covering devices, comprising disks $b$, are connected by draft-bars $b'$ to the draft-rod $b^2$, which is preferably shown of rectangular shape. These draft-bars are clamped to said draft-rod and same are adjusted on said rod, as indicated in Fig. 2. The draft-rod is supported by braces $b^3$, which are secured to the frame of the machine, and the ends of the draft-rod $b^2$ are loosely journaled in bearings formed in the lower ends of said braces. There is shown a plurality of disks, and it is apparent that the number may be increased. At one end of the draft-rod there is rigidly secured thereto a projecting stirrup $b^4$. This stirrup is swiveled to a bearing-block $b^5$. Said block $b^5$ forms a guide for the stem $b^6$ and a bearing for the lever end of spring $b^8$. At its upper end stem $b^6$ is secured to lever $b^7$, which in turn is pivoted in its lower end to the reduced end of draft-rod $b^2$. Coil-spring $b^8$ is shown embracing the stem $b^6$. A collar and pin $b^9$ constitute a bearing for the upper end of the coil-spring $b^8$. The block $b^5$ is swiveled in $b^4$. The lever $b^7$ projects upwardly in proximity to the operator's seat, and a curved bar $b^{11}$ is formed with notches into which the finger $b^{12}$ is adapted to engage. It is apparent that when the lever $b^7$ is moved rearwardly the furrow-openers are depressed by the collar and pin $b^9$ bearing downwardly against the coil-spring and same are held depressed by the tension of spring $b^8$. When the furrow-openers are to be lifted out of the ground, lever $b^7$ is moved forwardly and said furrow-openers are simultaneously lifted by reason of the pin $b^{10}$ engaging against the block $b^5$.

The fertilizing-distributer comprises an agitator $c$, shown in the form of a wheel with projecting fingers. This agitator is operated by connections comprising the bevel-gear $c'$, formed rigidly on the shaft of the agitator. The bevel-gear $c^2$ is formed rigidly on the shaft $c^3$ and engages with the bevel-gear $c'$. The shaft $c^3$ is rotated by a sprocket-wheel $c^4$, journaled securely to said shaft. The sprocket-chain $c^5$ connects with the sprocket-wheel $c^6$, supported on a shaft in the upper part of the machine, and this shaft is rotated by the sprocket-wheel connected by a sprocket-chain with the carrying-wheel shaft. An end of the shaft $c^3$ is journaled loosely in a bearing formed in the frame of the hopper, while the other end extends through a slotted opening in said frame and is journaled in lug $c^9$. A bar $c^7$, Fig. 1, is adapted to be slid up and down in a guide $c^8$, formed on the side of the hopper. The lug $c^9$ is secured to the bar $c^7$. By sliding this bar up and down the shaft $c^3$ may be oscillated back and forth for the purpose hereinafter indicated. The bottom of the hopper of the fertilizer-distributer is formed with an opening $c^{10}$, and a pipe $c^{11}$ has its upper end fitting in said opening. There is a guard $c^{12}$ formed in the bottom of the hopper with the opening. At one side thereof a gate $c^{13}$ is located within said opening, so as to regulate the amount of the fertilizer to be fed by the agitator $c$ into the chamber formed by the sides of the hopper and the guard $c^{12}$. This gate $c^{13}$ is rigidly secured to an oscillating shaft $c^{14}$, and this shaft is supported by bearings in the bottom of the hopper, and one end of same is rigidly connected to an arm $c^{15}$, which arm is pivoted to a sliding bar $c^{16}$, which in turn is operated by a hand-lever $c^{17}$, which can be adjusted to different positions. From Fig. 1 it is apparent that the operating-levers for the furrow-openers and gate, together with the sliding bar for regulating the gear, are all within reach of the seat of the operator. The opposite end of the pipe $c^{11}$ is located rearwardly of the shoe $a'$ and between the covering device $b$ of the shoe. I have also shown in Fig. 3 a cut-off $d$. The advantage of this construction is that the fertilizing material may be cut off by the slide $d$ while the bottom of the hopper is being cleaned or repaired. This is desirable, for the reason that in almost all kinds of fertilizers there are hard substances which cannot be fed through the machine and unless removed therefrom are very apt to injure the parts of same.

In Figs. 5 and 6 I have shown means for adjusting the angle of the covering devices or disk. The hub of the disk is formed with a plate $d'$. In the ends of this plate are formed certain circumferential slots $d^2$. This plate $d'$ is also formed with hub $d^3$, which is adapted to fit within the socket $d^4$, formed within the end of the draw-bar for the covering device. Screw-threaded pins $d^5$ project downwardly from the lower face of said draw-bar and are adapted to extend within the slotted openings $d^2$. By means of nuts the draw-bar can be securely fastened to the disk and held in different angular adjustments.

Having thus described my invention, I claim—

1. In a planter, the combination of feeding devices with covering devices, a cross-rod formed with flat faces, a drag-bar with jaws at its free end adjusted to be clamped to each of said cross-rods, a lifting-lever, a spring connection between said lifting-lever and said cross-rod, a covering device adjustably secured to one end of said drag-bar whereby said covering device can be moved laterally in its relation to the drag-bar, the drag-bar and covering device being adjustable in their relation to the machine, substantially as specified.

2. In a planter, the combination of a feeding device with a covering device adapted to coöperate therewith, a drag-bar adjustably secured to said machine, a covering device secured to one end of said drag-bar, and means for changing the position of said covering device relatively to the line of draft of said covering device, for the purpose specified.

3. In a planter, the combination with a frame, a drag-bar adjustably secured thereto, a covering device secured to one end of said drag-bar, adjustable clamping device for holding said covering device in different relative positions to the line of draft, for the purpose specified.

4. In a planter, the combination of a frame, a drag-bar adjustably clamped thereto, a covering device, a support for said covering device, means for adjusting laterally the support in its relation to the drag-bar, for the purpose specified.

5. In a planter, the combination of feeding devices, a support, a plurality of covering devices comprising a drag-bar adjustably clamped to said support, a lifting-lever pivoted on one end of said support, a linked connection between said lifting-lever and said support, a stirrup secured to said support, and a spring connecting said link and said stirrup, for the purpose specified.

In testimony whereof I have hereunto set my hand this 17th day of March, A. D. 1905.

GEORGE P. OATES.

Witnesses:
CHAS. I. WELCH,
BORDER BOWMAN.